(12) United States Patent
Hannon

(10) Patent No.: US 8,435,617 B2
(45) Date of Patent: May 7, 2013

(54) STITCHLESS SEAM SYSTEM FOR JOINING LAMINATES

(75) Inventor: Gregory E. Hannon, Landenberg, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 537 days.

(21) Appl. No.: 11/506,063

(22) Filed: Aug. 17, 2006

(65) Prior Publication Data

US 2008/0044614 A1 Feb. 21, 2008

(51) Int. Cl.
*B32B 3/00* (2006.01)

(52) U.S. Cl.
USPC ............................ 428/57; 428/36.1

(58) Field of Classification Search ............ 428/57, 428/36.1
See application file for complete search history.

(56) References Cited

U.S. PATENT DOCUMENTS

| | | | | |
|---|---|---|---|---|
| 3,562,041 A | | 2/1971 | Robertson | 156/73 |
| 4,668,316 A | | 5/1987 | Sager | 156/73.1 |
| 4,938,817 A | | 7/1990 | Langley | 156/73.1 |
| 4,954,388 A | * | 9/1990 | Mallouk et al. | 428/198 |
| 5,232,529 A | * | 8/1993 | Miyake | 156/73.4 |
| 5,571,596 A | * | 11/1996 | Johnson | 428/143 |
| 6,103,325 A | * | 8/2000 | Zins et al. | 428/36.1 |
| 6,128,785 A | * | 10/2000 | Sommeregger | 2/162 |
| 6,638,605 B1 | | 10/2003 | Ankuda, Jr. et al. | |
| 6,797,088 B2 | | 9/2004 | Solinski | 156/73.4 |
| 7,140,153 B1 | * | 11/2006 | Humphreys et al. | 52/173.3 |
| 2002/0095711 A1 | * | 7/2002 | Saito et al. | 2/71 |
| 2003/0135185 A1 | | 7/2003 | Crowther | 604/385.01 |
| 2005/0114989 A1 | | 6/2005 | Harward | 2/275 |

FOREIGN PATENT DOCUMENTS

| | | |
|---|---|---|
| DE | 834 538 | 3/1952 |
| EP | 1 224 876 | 7/2002 |
| EP | 1 293 137 | 3/2003 |
| FR | 2 115 456 | 7/1972 |
| JP | 09 059866 | 3/1997 |
| WO | 2005/000055 | 1/2005 |
| WO | WO2005/000055 | 1/2005 |
| WO | WO2005/122806 | 12/2005 |

* cited by examiner

*Primary Examiner* — Brent O'Hern
(74) *Attorney, Agent, or Firm* — Amy L. Miller

(57) ABSTRACT

A stitchless seam between a first panel having a functional layer and a second panel having a functional layer is provided. The seam system is formed via a discontinuous fused stitchless seam which connects a first panel to a second panel. A reinforcement may be used to strengthen the discontinuous fused stitchless seam connecting the first panel to the second panel, allowing formation of a liquid-impervious stitchless seam system. A method for forming the system is also provided.

27 Claims, 7 Drawing Sheets

STITCHLESS SEAM SYSTEM FOR JOINING LAMINATES

BACKGROUND OF THE INVENTION

The present invention relates to a stitchless seam system between laminates which results in a functionally liquid-proof stitchless seam width created between adjacent panels of laminates. The stitchless seam system is of use in the construction of high performance waterproof apparel and footwear. While traditional fused seams are useful in liquid proof garments, such seams tend to be rather stiff. Further, the continual flexing of the stitchless seam leads to a reduced lifespan of the garment. The stitchless seam of the present invention allows the formation of seams of very small dimension which provide flexibility and retain the integrity of the seam to prevent cracking. The use of coated textile composites or laminates of textiles and liquid protective barrier membrane layers to create liquid-proof protective apparel and protective footwear is known in the industry. The most common of these applications is waterproof breathable apparel. Typical examples are laminate materials sold by W.L. Gore and Associates, Inc. under the registered trade name GORE-TEX, which contain a waterproof breathable film laminated, or bonded, to one or more textile layers. These laminates are fabricated into apparel and footwear and sold as GORE-TEX® garments and the like. Coated textiles can also be used in textile composites for these same purposes.

Pieces or panels of these laminates are joined together to form garments and other similar textile structures. In the case of footwear, pieces or panels of laminates are typically joined together to form booties which are then integrated as a liner in the shell of the footwear and combined with the sole. For the garments and footwear to be liquid proof and protective, there is a need to seal the seams where the panels of laminate are joined together. The joining of these laminate panels is typically done by first sewing the laminates together using conventional sewing techniques. Liquid-proof sealing of these sewn seams is then accomplished by the application of a seam seal tape having a thermoplastic hot-melt adhesive which seals to the surface of the coating or protective barrier film and creates a seal over the sewing holes and the area where the layers join between the stitches. The seam seal tape may be heated, for example, using a nozzle to direct a stream of hot air so as to melt the adhesive. The tape is then applied over the seam and both are passed through the nip of a pair of pressure rollers in order to squeeze the molten adhesive onto the protective layer surface to ensure good bonding of the tape to the surface. For aesthetic reasons, the seam sealing tape is generally applied to the interior of a garment so that it is hidden from view. In the case of a bootie for covering the foot, the seam sealing tape is generally applied to the exterior of a bootie which is between the lining material and the shell of the footwear so that it is hidden from view. Less common sealing techniques such as gluing and fusing are also known in the art.

Different fused seams have been disclosed in the art, but none of the prior art teaches the present invention. U.S. Pat. No. 6,797,088 discloses a method for connection of pieces of textile fabric. In this method, a cut edge is formed and the threads bound at the cut edge of each of the textile pieces. The textile pieces are then laid on each other in an overlapping manner and the pieces are pressed together between a sonotrode and an anvil. At least one of the sonotrode or anvil has a surface profile with a number of elevations. The textile pieces are connected by ultrasonic oscillation of the sonotrode. The pattern of elevations in the sonotrode and/or anvil results in fusion or plasticization of the textile pieces at particular points only while leaving textile fabric at other points. Thus, a discontinuous ultrasonically fused seam is produced.

U.S. Pat. No. 6,103,325 discloses an ultrasonically formed seam comprising a laminate sheet constructed solely of a polyester fabric on one side and a polyurethane coating on the other side of the sheet. To form the seam, sides of the fabric coated with polyurethane are brought into contact and ultrasonic energy is applied to fuse the fabrics together to form a unitary, monolithic fluid-proof seam;

Publication No. WO2005/000055 discloses a fused seam between the edges of two laminates wherein each textile layer is made up of two components with different melting temperatures. The seam is formed by the melted second component and the non-melted first component of the textile layers of each laminate. Edges of the seamed laminates are in an edge-to-edge butt orientation.

Publication No. US2003/0135185 discloses adhesiveless absorbent garments, the components of which are held together by one or more adhesiveless bonds. In one embodiment, the adhesiveless bonds are formed ultrasonically.

A need exists in the garment and footwear industry for a reliable and effective technique for joining two or more panels of a complex or multi-layered textile laminate construction to form a flexible liquid-proof seam in garments and protective footwear. There is a further need in the industry for a liquid-proof fused seam which exhibits flexibility, durability, strength, and crack resistance. The present invention solves the need of the industry.

DEFINITIONS

"Panels" are laminates with at least one barrier layer and at least one additional layer, such as a textile, non-woven, or other suitable substrate layer.

Panels may further comprise coated textiles, protective layers, barriers, membranes, or films.

"Protective layer", "barrier layer", "functional layer", or "film" are defined as a film or coating that provides a barrier to liquid water penetration as a minimum, and ideally to a range of liquid chemical challenges. The layer is considered liquid proof if it prevents liquid water penetration against a pressure of at least 0.07 bar for a duration of at least 3 minutes. The protective layer material preferably guarantees a water penetration pressure of more than 0.07 bar. The water penetration pressure is measured on a liquid-proof panel based on the same conditions described with respect to the Suter Test for Liquid-proof Seams, described herein.

"Seam" is defined as the area where 2 or more panels are permanently joined together by sewing, gluing, fusing, or other mechanical joining.

"Liquid-proof seam" is a stitchless seam that will not leak or weep liquid when challenged with a test fluid at a pressure of at least 0.07 bar for a duration of at least 3 minutes. The test fluid is at minimum water, and ideally can be a range of liquid chemicals.

"Garments" is defined as apparel including coats, jackets, shirts, pants, suits, gloves, hats, or other structures formed from joined laminate panels.

"Footwear" is defined as a covering for the foot, such as a shoe, boot, sock, or the like, which incorporates one or more laminate panels including a protective layer, said laminate panels being joined together by at least one durably liquid-proof seam. The laminate panels may form a bootie as a liner within the footwear, or alternatively the joined laminate panels may comprise both liner and upper of the footwear when attached to or with other components of the footwear.

"Discontinuous seam" is defined as a seam with broken areas; or alternately at least one continuous fused stitchless seam with points in varying proximity to the cut edge.

"Reinforcement" is defined as any material suitable to increase the strength of a seam connecting a first panel to a second panel. A reinforcement may provide a liquid-impervious seam. The reinforcement traverses the discontinuous fused seams and joins a first panel to the second panel.

"Seam width" is defined as the distance from the cut edge of a panel to the seam portion most distal to the cut edge.

SUMMARY OF THE INVENTION

The present invention provides a liquid-proof stitchless seam system between at least two panels. The system comprises a first panel having a functional liquid-proof layer; a second panel having a functional liquid-proof layer; and a discontinuous seam connecting the first panel to the second panel. A reinforcement may be added which strengthens the discontinuous seam connecting the first panel to the second panel providing a liquid-impervious seam.

The present invention further provides a liquid-proof stitchless seam between panels comprising a first panel having a functional liquid-proof layer and a second panel having a functional liquid-proof layer connected by a first discontinuous seam. The first discontinuous seam connects the first panel to the second panel; and a second seam may be added which strengthens the first discontinuous seam connecting the first panel to the second panel providing a liquid-impervious seam.

Further provided is a method of forming a fused liquid-proof stitchless seam by joining together pieces of liquid-proof laminate. This is achieved by placing at least two pieces of a liquid-proof laminate each having at least a textile layer and a liquid-proof functional layer in stacked relation with their textile regions in contact with one another to form seam width area defining the positioning of a stitchless seam line. Heat and pressure are than applied to the stacked laminates along the seam width, the heat being applied continuously and the pressure being applied at a constant interval most proximal to the edge of the stitchless seam line forming a continuous stitchless seam and at spaced-apart intervals juxtaposed to the continuous stitchless seam to form a discontinuous stitchless seam thereby forming multiple seams along the seam region. The continuous stitchless seam may be a cut weld seam. A reinforcement may be added to strengthen the bond between panels.

DETAILED DESCRIPTION OF THE INVENTION

Figure 1A:
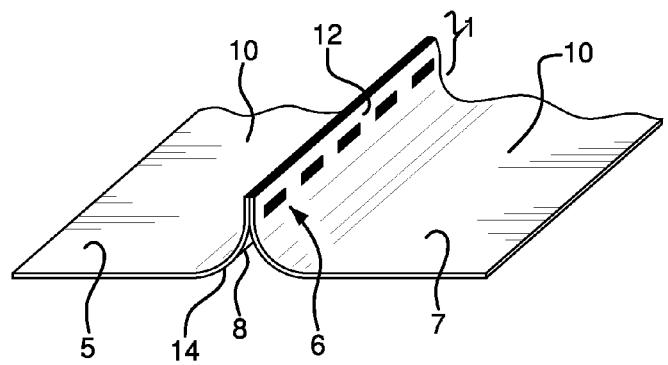
FIGS. 1A-1F show schematic drawings representing two panels joined by a discontinuous fused seam.

The present invention provides a stitchless seam system 1 formed by fused garment panels such as liquid-proof laminates with a continuous stitchless seam adjacent to a discontinuous stitchless seam. In a preferred embodiment of the present invention, the stitchless seam system 1 comprises two or more panels of laminate ultrasonically fused to form at least one continuous stitchless seam adjacent to one or more discontinuous stitchless seams. The stitchless seam system 1 of the present invention is well suited for formation between panels which are functionally liquid proof.

FIGS. 1A-1F show the present invention in its simplest embodiment, as a stitchless seam system 1 formed between at least two panels via a discontinuous seam 6, shown as connecting the first panel 5 to the second panel 7. The panels comprise an exterior side 8, an interior side 10, and a cut edge. The panels are joined in a stacked relation via a discontinuous seam 6. The cut edge 12 may also have a cut weld 14 formed at the perimeter of the panels. The cut weld 14 may be formed by a cutting wheel or ultrasonic fusion. The distance between the cut edge and the most distal portion of the discontinuous seam 6 is referred to as the seam width 15. The term discontinuous seam 6 refers to a stitchless seam wherein the bonded edges parallel to and fartherest from the cut edges of the panels are discontinuous. Suitable types of fusing include ultrasonic, radio-frequency (RF), thermal, adhesives, localized thermal bonding. A secondary seam may be used with the discontinuous seam 6 to form the stitchless seam system 1 of the present invention. As shown in FIGS. 1B, 1C, 1E, and 4, the stitchless seam system 1 may further comprise a reinforcement 5 for added durability and/or strength.

Figure 1B:
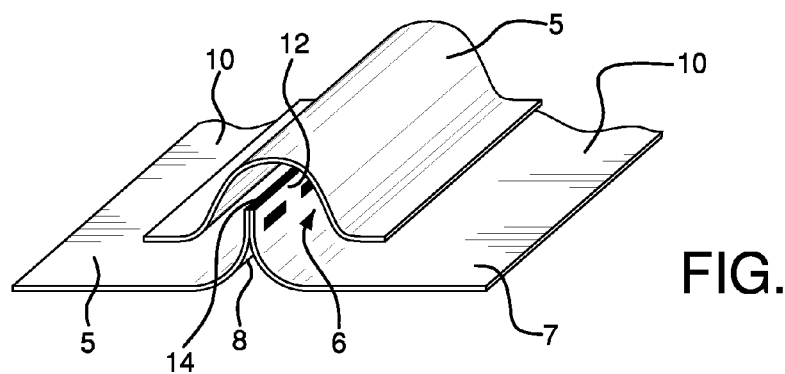
Figure 1C:
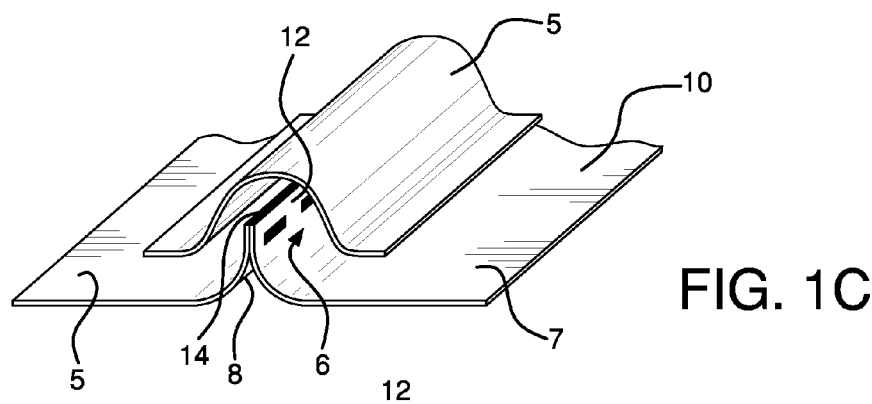
Figure 1D:
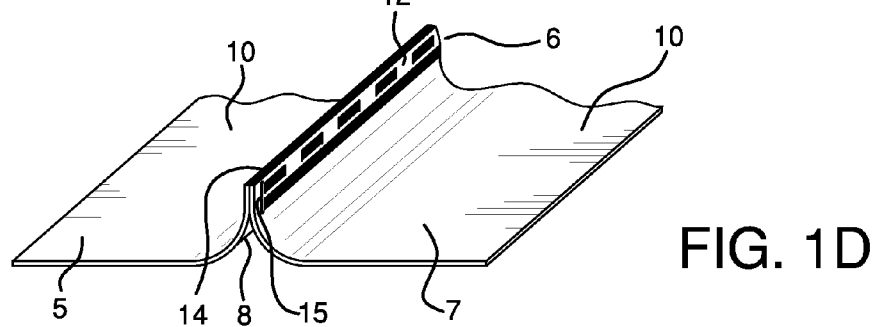
Figure 1E:
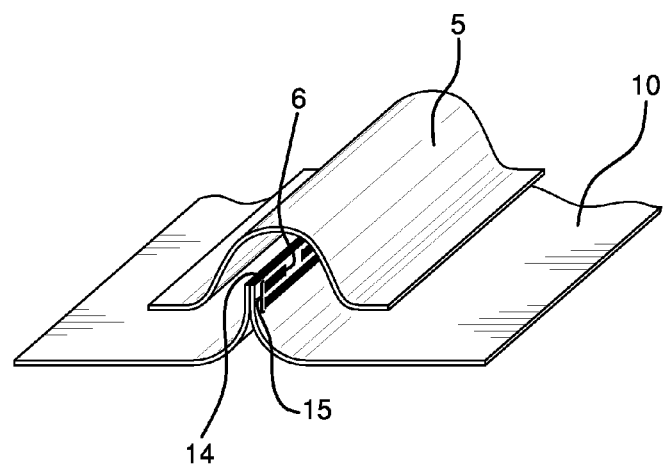
Figure 1F:
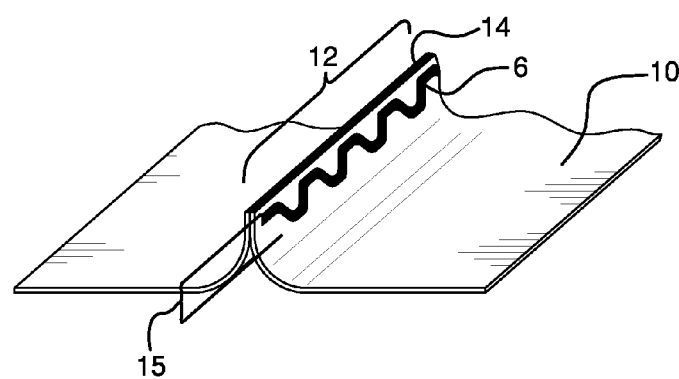
Figure 2:
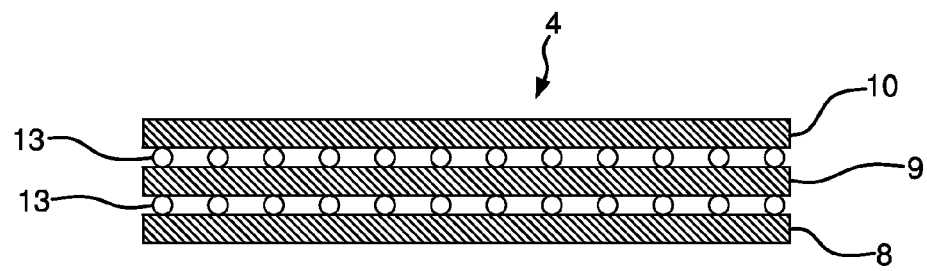
FIG. 2 shows a cross sectional view of a three-layer laminate prior to fusing, sewing, or sealing.
Figure 3:
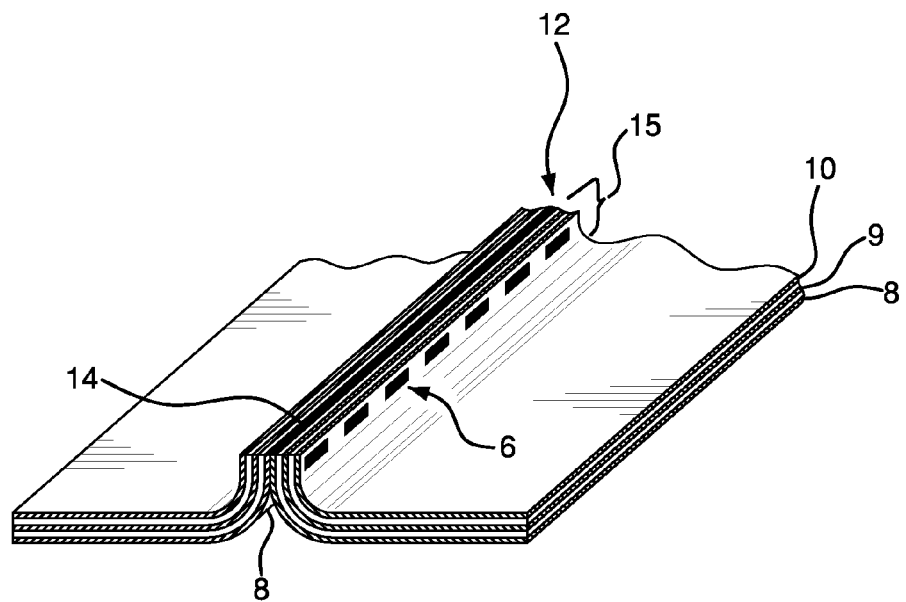
FIG. 3 shows a cross sectional view of two three-layer laminate panels that are bonded via a discontinuously fused seam configuration formed by an embossing rib.

It is to be noted that a discontinuous stitchless seam system 1 (FIGS. 1A-1E, and 3-6) may be comprised of a fused stitchless seam with broken areas; or alternately at least one continuous fused stitchless seam with points in varying proximity to the cut edge as shown in FIG. 1F. One or more seams oriented essentially parallel to the cut edge in the seam region make up the seam width 15. Depending upon the seam width and the distance between multiple seams, the seam system width will vary. FIG. 2 shows a panel 4 comprising a multi-layer laminate useful in the present invention. The multi-layer laminate comprises an exterior side 8, an interior side 10, and a functional layer 9. The functional layer 9 may be a membrane, a film, a laminate comprising a polytetrafluoroethylene (PTFE), expanded PTFE, polyurethanes, or other suitable substrates. The functional layer may provide the panel with a functionally liquid-proof film or membrane that will not leak or weep when challenged with a test fluid at a pressure of at least 0.07 bar for a duration of at least three minutes. The individual layers making up the laminate may be bonded via an adhesive 13 or may be otherwise joined.

In one embodiment as shown in FIGS. 1B and 1C, a reinforcement 5 may be used with the discontinuous seam to increase the strength of the stitchless seam system 1 connecting the first panel 5 to the second panel 7 and providing a liquid-impervious seam. The reinforcement 5 may be of any suitable material including: textile tapes, waterproof tapes, threads or waterproof textile laminates, thread, tape, Kevlar™, polyester, nylon, inelastic substrates, seam tape, textile laminate, sealing polymers, or other materials which as a whole provide reinforcement 5 to the seam system when subjected to stress or wear. The reinforcement 5 traverses the discontinuous fused seams and further joins the first panel 5 to the second panel 7. A thin reinforcement 5 is desired which sufficiently withstands strain and allows maximum flexibility. The reinforcement 5 may offer barrier properties. The reinforcement 5 may be incorporated as a part of a seam tape. In this aspect, the reinforcement 5 need not be as wide as the seam tape to allow the tape edges to achieve a thinner profile than that of the tape in proximity to the reinforcement 5. It is contemplated that a discontinuous seam 6 may be used in conjunction with a sealing polymer to provide barrier properties. It is further contemplated that one or more additional fused seams may be incorporated into the stitchless seam region width. The one or more additional fused seams may be either continuous, discontinuous, or a combination of the two types of fused seams. It is preferred that the additional seams are heat welded. The reinforcement 5 may be a multi-layer stitchless seam tape comprising a top layer, an adhesive layer, and a reinforcement 5. The reinforcement 5 may be a distinct layer used to improve the seam strength, after application applied to the fused seam. The reinforcement 5 may improve the liquid proofness of the seam and/or improve the seam strength. Preferably the reinforcement 5 is applied to the inner side of a liquid-proof panel in an article. In one embodiment of the present invention the reinforcement 5 is in the form of a seam tape as shown in FIGS. 1B, 1C, and 1E. The seam tape may be secured on either side of the seam itself. For aesthetic reasons, the seam tape is usually applied to the interior of a garment, so that it is hidden from view. Therefore, the seam tape is preferably secured to the lining side of a garment or accessory. The seam tape may be a fusible adhesive tape, a fusible textile tape, or a fusible laminate tape. One example of a fusible tape is a weldable tape comprising at least one thermoplastic component which is meltable at a temperature in the range 80° C. to 230° C. In another embodiment, the seam tape may be a thermoplastic film which softens and flows when heated. More usually, the seam tape comprises a backing tape having a covering of hot-melt adhesive on one side.

Figure 4:
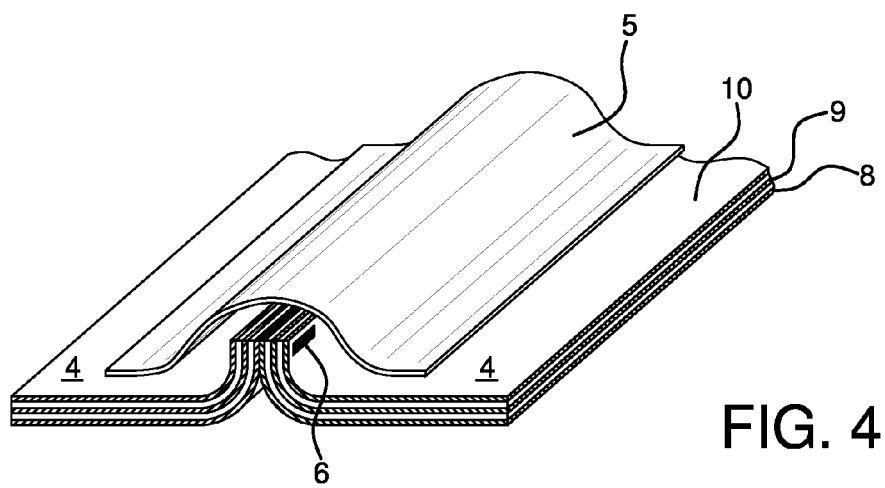
FIG. 4 shows a cross sectional view of another embodiment of a discontinuous seam configuration between three-layer laminate panels with a reinforcement bridging over the seam and adhering to the cut ends and interior sides of the panels.
Figure 5:
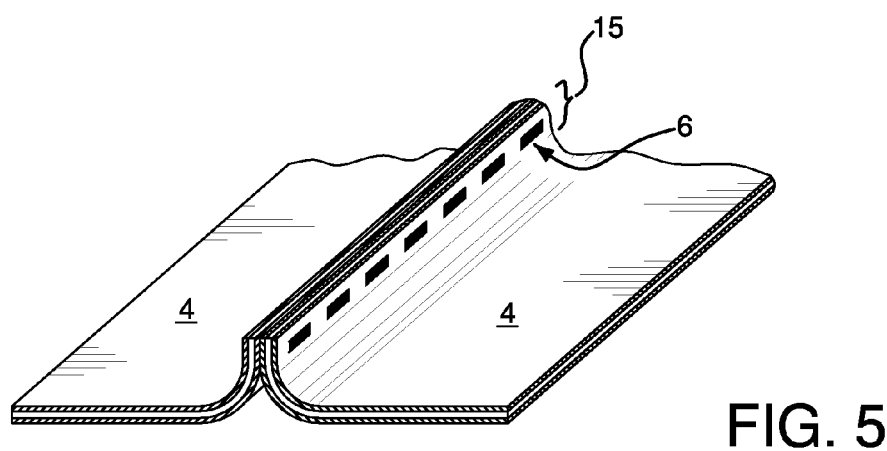
FIG. 5 shows a cross sectional view of a two-layer laminate panel where the complex textile structure has been fused to form a discontinuous stitchless seam region.
Figure 6:
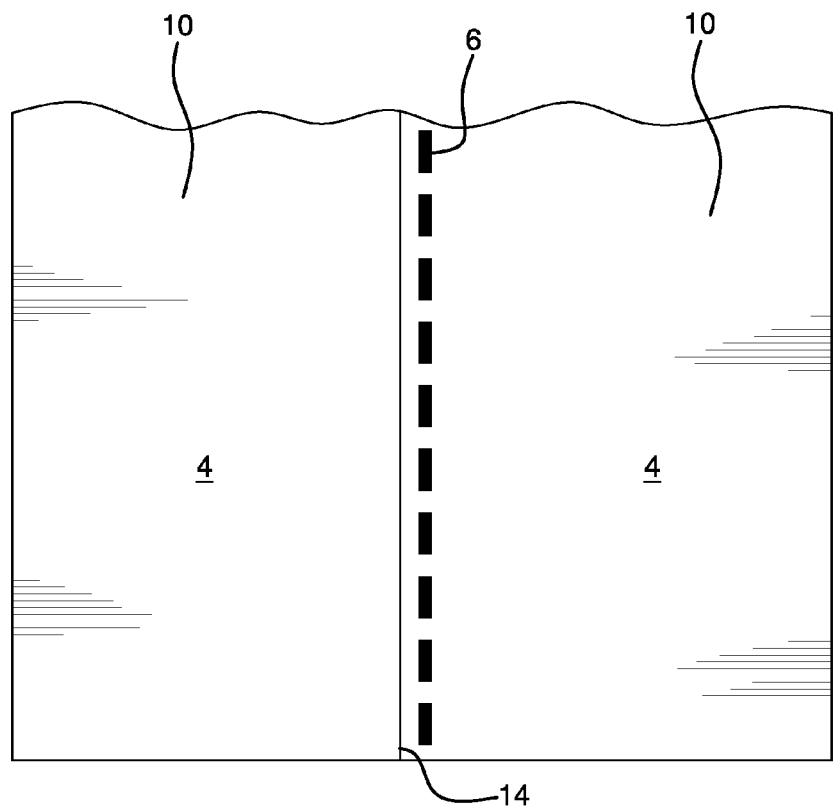
FIG. 6 shows a top perspective view of a discontinuous stitchless seam used to join two laminate panels; in this view the cut edge is pressed to one side.

In one embodiment, after a discontinuous seam 6 has been produced according to the present invention, a seam tape (reinforcement 5) is heated, for example using a blast of hot air so as to melt the adhesive. The reinforcement 5 is then applied over the seam and both are passed through the nip of a pair of pressure rollers in order to squeeze the molten adhesive into the panels 4 so as to ensure good bonding of the reinforcement 5 to the underlying panels 4. The discontinuous seam 6 and the seam tape on panels are transported continuously through the distance and joined together. Any width of reinforcement 5 such as a seam tape may be used. However, the present invention also allows the use of very thin, narrow seam tapes because of the thin fused discontinuous seam 6 itself and the fact that there is no real seam allowance. Preferably the seam tape has a width of not more than 15 mm. For liquid-proof seams, it is advantageous to contiguously bond the seam tape to both panels and the seam width and cut weld regions of the seam, as shown in FIG. 4.

Figure 7:
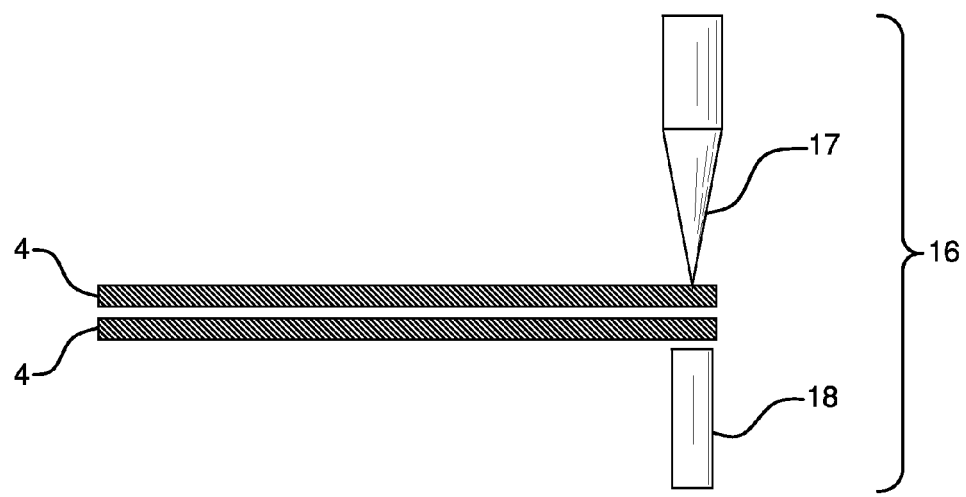
FIG. 7 shows a side view schematic of a sonic welder with two panels in a stacked relationship to each other.

In another aspect the stitchless seam system 1 may further comprise a continuous bond connecting the designated cut edge 12 of the first panel 5 to the cut edge 12 of the second panel 7 in a stacked relation to each other so that the exterior sides 8 of the panels are bonded to each other, FIG. 1A. The fabric panels may be fused together at their edges by a sonic fuse bead. As shown in FIG. 7, a sonic fuse may be formed with a head having integral embossed fusing and cutting functions. The sonic fuse bead is formed as the sonic welder 16 passes high frequency waves through panels to join them. The discontinuous seam 6 is formed by lying two panels on top of each other with the outer facing textiles in contact with each other. A fused stitchless seam is created along one edge of the layered laminate panels by moving the layered panels between a rotating anvil 17 and sonotrode 18. The layers are run so that the anvil simultaneously cuts and fuses the edge of the panels together. In a preferred embodiment, both the anvil and sonotrode speed settings are the same.

The sonic waves vibrate the panels, creating heat through the friction of one panel against another. The sonic fusing process essentially melts or otherwise fuses the edges of the fabrics together. The head of the welder, or anvil 17, may comprise a embossing rib 21 on a ultrasonic fusing wheel 20 having a profile thereon which determines the width of the sonic fuse bead made, as well as a cutting rib which is sharp enough to trim extraneous portions of the fabric panels on the waste side of the discontinuous seam 6 at the time the seam is formed via sonic fusion. The cutting rib 23 may form either a discontinuous or a continuously fused bond at the outer edge as it melts and cuts the panels. When both a continuous and discontinuous bond are formed in the seam region, it is advantageous to orient the continuous bond parallel to and in close proximity to the discontinuous bond, to provide a narrow width stitchless seam region. The discontinuous bond may be formed in varying patterns including a cross-hatch pattern, a dotted pattern, a sinusoidal pattern, or any other suitable pattern or stitchless seam edge design. FIGS. 9-14 show some examples of the discontinuous seam formed via an embossing rib 21. As can be seen, the embossed designs may be of varying lengths, widths and patterns depending upon their desired applications.

In one aspect of the present invention, a stitchless seam system 1 is provided which is impervious to liquids and comprises a first panel 5 with a liquid-proof functional layer 9 having an exterior side 8, an interior side 10, and a designated stitchless cut edge 12; a second panel 7 with a liquid-proof functional layer 9 having an exterior side 8, an interior side, and a designated stitchless seam edge; and a discontinuous bond connecting the designated stitchless seam edge of the first panel 5 to the designated stitchless seam edge of the second panel 7 in a stacked relation to each other so that the exterior sides 8 of the panels are bonded to each other with the bonded areas most distant from the stitchless seam edges of the panels forming a discontinuously bonded joint on the plane formed by the exterior sides 8 of the joined panels.

Figure 8:
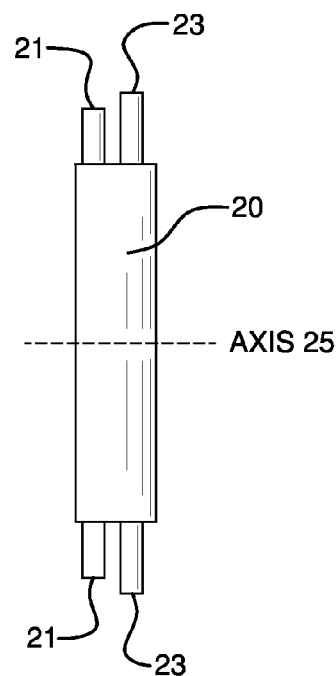
FIG. 8 shows a cross-sectional view of an ultrasonic fusing wheel with a cutting rib.
Figure 9:
FIGS. 9-14 show various contemplated discontinuous seam patterns.
Figure 10:
Figure 11:
Figure 12:
Figure 13:
Figure 14:

FIG. 8 shows a cross section of a fusing wheel 20 used to create a discontinuous seam 6 via ultrasonic bonding. The fusing wheel 20 comprises at least one circumferential discontinuous embossing rib 21 mounted on the wheel which usually rotates around an axis 25. The embossing rib 21 allows the panels to be bonded together without puncturing the panels 4, at the points where the embossing rib contacts the panels. The ultrasonic fusing wheel may further comprise a circumferential cutting rib 23, as shown in FIG. 8. It is preferred that the circumferential cutting rib 23 is mounted at least 0.1 mm from the discontinuous embossing rib. The circumferential cutting rib 23 projects further outward from the wheel than does the discontinuous embossing rib 21. The stitchless seam allowance may be cut simultaneously with the application of the fused cutting seam or seams produced by the cutting rib 23, or alternatively via a separate step.

The circumferential cutting rib and the discontinuous embossing rib are preferably parallel to each other. However, it is foreseen that in some designs the discontinuous embossing rib and the cutting rib may not be parallel to each other. For instance, the discontinuous seam 6 connecting the first panel 5 to the second panel 7 is applied at the same time as the panels are cut on the designated stitchless seam edge.

The stitchless seam system 1 of the present invention is novel in that the stitchless seam is able to obtain strengths greater than 200 N at breaking. Further, the stitchless seam system 1 of the present invention is shown to withstand continuous wash and dry cycles for at least twenty-four hours without experiencing edge separation of the panels A method is provided for forming a waterproof stitchless seam system 1. The seam system is formed by joining together pieces of waterproof laminate so that at least two pieces of a waterproof laminate, each having at least a textile layer and a liquid-proof functional layer 9, are placed in stacked relation with textile regions in contact with one another along a strip defining a seam region. Heat and pressure are applied to the stacked laminates along said strip, with the heat being applied continuously and the pressure being applied at a constant interval most proximal to the edge of the stitchless seam line forming a continuous seam. The heat and pressure are applied in either spaced-apart intervals juxtaposed to the continuous seam, or in a continuous manner to form a discontinuous stitchless seam thereby forming multiple seams along the strip. The multiple seams form a width located across the area referred to as the seam region and run longitudinally with the panels, as shown in FIGS. 1A-1F.

The layered panels are channeled under the wheel to produce a single continuous fused cut weld which creates a continuous seam along the cut edge of the panels along with a discontinuous fused line which creates a discontinuous seam 6 located adjacent to and in a direction that is parallel to the cut edge fuse.

A reinforcement 5 may be applied to strengthen the discontinuous seam 6. For instance, a reinforcement 5 such as a seam tape with a hot-melt polyurethane adhesive, may be applied to the sealing region by heating the stitchless seam tape to a temperature sufficient to melt the polyurethane adhesive and passing the tape and stitchless seam under pressure rollers in order to squeeze the molten adhesive onto the protective layer surface so as to ensure good bonding of the tape to the surface. The stitchless seam region may be reinforced by one or more reinforcements, including but not limited to tapes, threads, and textile laminates. An additional cooling and quenching step may be performed to provide a smooth seam. After a reinforcement seam tape is applied over the discontinuous seam and cut weld, the heated reinforcement tape is then cooled while undergoing the application of pressure to provide a smoother seam.

While particular embodiments of the present invention have been illustrated and described herein, the present invention should not be limited to such illustrations and descriptions. It should be apparent that changes and modifications may be incorporated and embodied as part of the present invention within the scope of the following claims. The following examples are offered for illustrative purposes, and are not intended to limit the scope of the invention.

Example 1

Fuse Cut/Tape-ST78AU/Tricot

A liquid-proof stitchless seam was formed between two laminate panels in the following manner.

A three-layer textile laminate was formed comprising a composite barrier membrane sandwiched between two textile layers. The composite barrier membrane was a composite of microporous polytetrafluoroethylene (PTFE) membrane coated with a polyurethane, prepared according to U.S. Pat. No. 4,194,041 using a water vapor permeable, nonporous polyurethane coating on the ePTFE. This membrane was laminated on one side, using a plurality of dots of moisture curable polyurethane adhesive, to a Polyester/Spandex woven textile layer approximately 0.4 mm thick and having a weight of approximately 97 grams per square meter. The other side of the membrane was laminated, again using a plurality of dots of moisture curable polyurethane adhesive, to a nylon tricot knit textile approximately 0.6 mm thick and having a weight of approximately 38 grams per square meter. Two panels having rough dimensions of about 0.15 m by 0.7 m were then cut from this three-layer textile laminate.

The two panels were laid flat on a table on top of each other with the nylon/spandex textiles in contact with each other. A fused stitchless seam was created along one edge of the layered laminate panels by moving the layered panels between a rotating anvil and sonotrode. The layers are run so that the anvil simultaneously cuts and fuses the edge of the fabrics together to make what is commonly referred to as a butt weld. This weld was accomplished using a Lacemaster/Seammaster Ultrasonic Sewing Machine available from Sonobond Ultrasonics (West Chester, Pa.) equipped with an R1027 anvil. The machine was run under the following conditions—speed equal to 2, amplitude equal to 10, and air pressure set at 60 psi. Both the anvil and sonotrode speed settings were kept the same. The stitchless seam was made by running the layered panels on the right side of the wheel to produce a single continuous fuse line.

A 13 mm width stitchless seam tape (GORE SEAM® stitchless seam tape obtained from W.L. Gore and Associates, Elkton, Md.), having a hot-melt polyurethane adhesive, was then applied to the sealing region by heating the stitchless seam tape to a temperature sufficient to melt the polyurethane adhesive and passing the tape and stitchless seam through the nip of a pair of pressure rollers in order to squeeze the molten adhesive onto the protective layer surface so as to ensure good bonding of the tape to the surface. The resulting stitchless seam between the two laminate panels was tested using the Suter Test for Liquid-proof Seams and determined to be liquid proof based on passage of a 0.07 bar/3 min challenge. The stitchless seam was then subjected to the Test for Durably Liquid-proof Seams, and after the wash/dry regimen, the sample again passed the 0.07/3 min challenge. As a further evaluation, the sample was then subjected to a more rigorous stitchless seam challenge of 3 psi (0.22 bar)/2 min in the Suter test rig, and no water was observed; thus, the sample remained durably liquid proof under the most rigorous conditions. After further evaluation, it was found that the textile outer surface had cracked and when the stitchless seam was pulled in a direction perpendicular to the direction of the stitchless seam that the outer fabrics had separated.

Example 2

Fuse Cut/Tape-ST78AU/Tricot

A liquid-proof stitchless seam was formed between two laminate panels in a manner substantially as described in Example 1, with the following exceptions.

The two panels were laid flat on a table on top of each other with the nylon/spandex textiles in contact with each other. A fused stitchless seam was created along one edge of the layered laminate panels by moving the layered panels between a rotating anvil and sonotrode. The layers are run so that the anvil simultaneously cuts and fuses the edge of the fabrics together to make what is commonly referred to as a butt fuse. This fusing was accomplished using a Lacemaster/Seammaster Ultrasonic Sewing Machine available from Sonobond Ultrasonics (West Chester, Pa.) equipped with an R1027 anvil. The machine was run under the following conditions—speed equal to 2, amplitude equal to 10, and air pressure set at 60 psi. Both the anvil and sonotrode speed settings were kept the same. The stitchless seam was made by running the layered panels on the left side of the wheel to produce a single continuous fuse line along the edge of the panels along with a discontinuous fuse located approximately 0.8 mm in a direction that is perpendicular to the continuous fuse.

A 13 mm width stitchless seam tape (GORE SEAM® stitchless seam tape obtained from W. L. Gore and Associates, Elkton, Md.), having a hot-melt polyurethane adhesive, was then applied to the sealing region by heating the stitchless seam tape to a temperature sufficient to melt the polyurethane adhesive and passing the tape and stitchless seam through the nip of a pair of pressure rollers in order to squeeze the molten adhesive onto the protective layer surface so as to ensure good bonding of the tape to the surface. The resulting stitchless seam between the two laminate panels was tested using the Suter Test for Liquid-proof Seams and determined to be liquid proof based on passage of a 0.07 bar/3 min challenge. The stitchless seam was then subjected to the Test for Durably Liquid-proof Seams, and after the wash/dry regimen, the sample again passed the 0.07/3 min challenge. As a further evaluation, the sample was then subjected to a more rigorous stitchless seam challenge of 3 psi (0.22 bar)/2 min in the Suter test rig, and no water was observed; thus, the sample remained durably liquid proof under the most rigorous conditions. After further evaluation it was found that the textile outer surface had not cracked and when the stitchless seam was pulled in a direction perpendicular to the direction of the stitchless seam that the outer fabrics had not separated.

Example 3

The seam strength of the samples manufactured in Example 1 and Example 2 was evaluated using a modified grab break method. Five 4"×8" samples were cut from each sample produced in Example 1 and Example 2 using a Lab 500 USM Clicker Press (model SN-SE25 available from Hudson Machinery Worldwide). The cut sample was oriented so that the seam was parallel to the direction of the 4" sides. The seam was located approximately 4" in from the cut edge along the 8" length and ran perpendicular to the 8" direction. Samples were mounted on an Instron tester (Instron Model 5565 available from Instron Corporation) using a clamping fixture that provided a 1" square of clamped area. A gap of 4" was maintained between the clamps. Care was take to locate the seam equidistant from each set of clamps as well as locating the center line of the clamps that runs perpendicular to the seam 2" from the cut edge running in a direction perpendicular to the 8" edge. Once mounted, the Instron tester applied a constant displacement of 50 mm/min to the sample in a direction perpendicular to the seam direction. The Instron tester records the load during the displacement. The test was completed when a maximum load in Newton and percent strain were recorded when the seam broke.

|  |  | Seam Strength (N) | % Strain at Break | Average | St. Dev. |
|---|---|---|---|---|---|
| Example 1 | ST78AV Cut-1 | 221 | 18 | 214 | 6 |
| Example 1 | ST78AV Cut-2 | 211 | 17 |  |  |
| Example 1 | ST78AV Cut-3 | 215 | 17 |  |  |

-continued

|  |  | Seam Strength (N) | % Strain at Break | Average | St. Dev. |
|---|---|---|---|---|---|
| Example 1 | ST78AV Cut-4 | 218 | 17 |  |  |
| Example 1 | ST78AV Cut-5 | 206 | 16 |  |  |
| Example 2 | ST78AV 1027T-1 | 262 | 19 | 261 | 5 |
| Example 2 | ST78AV 1027T-2 | 264 | 20 |  |  |
| Example 2 | ST78AV 1027T-3 | 259 | 20 |  |  |
| Example 2 | ST78AV 1027T-4 | 254 | 19 |  |  |
| Example 2 | ST78AV 1027T-5 | 266 | 19 |  |  |

What is claimed:

1. A liquid-proof stitchless seam for garments comprising:
  a. a first garment panel comprising a first textile layer and a first functional liquid-proof layer;
  b. a second garment panel comprising a second textile layer and a second functional liquid-proof layer;
  c. a discontinuous fused stitchless seam connecting the first garment panel to the second garment panel; and
  d. a reinforcement which strengthens the fused stitchless seam connecting the first garment panel to the second garment panel,
    wherein the reinforcement traverses the fused stitchless seam and further connects the first garment panel and the second garment panel, and
    wherein the reinforcement provides a liquid-impervious seam.

2. A liquid-proof stitchless seam for garments comprising:
  a. a first panel comprising a functional liquid-proof layer, an exterior side, and an interior side;
  b. a second panel comprising a functional liquid-proof layer, an exterior side, and an interior side;
  c. a discontinuous fused stitchless seam connecting the first panel to the second panel; and
  d. a continuous fused stitchless seam positioned parallel to the discontinuous seam and connecting the first panel to the second panel providing a liquid-impervious seam,
    wherein the first panel and the second panel are in stacked relation to each other so that the exterior sides of the panels are bonded to each other.

3. The stitchless seam of claim 1 wherein the discontinuous fused, stitchless seam is an ultrasonic heat weld.

4. The stitchless seam of claim 1 wherein the reinforcement is a tape.

5. The stitchless seam of claim 1 wherein the reinforcement is a textile laminate.

6. The stitchless seam of claim 1 wherein the reinforcement is a non-fused stitchless seam in conjunction with a sealing polymer.

7. The stitchless seam of claim 1 wherein the reinforcement is a sealing polymer.

8. The stitchless seam of claim 1 further comprising a second fused seam.

9. The stitchless seam of claim 8 where the second fused stitchless seam is a continuous heat-fused seam.

10. The stitchless seam of claim 1 wherein the reinforcement traverses the discontinuous fused seams and joins the first garment panel to the second garment panel.

11. The stitchless seam of claim 1 wherein each said first and second functional liquid-proof layer is a membrane.

12. The stitchless seam of claim 1 wherein each said first and second functional liquid-proof layer comprises ePTFE.

13. A liquid proof stitchless seam for garments comprising:
  a. a first panel including a first textile layer and a first functional liquid-proof layer, said first functional liquid-proof layer having an exterior side, an interior side, and a designated stitchless seam edge;

b. a second panel including a second textile layer and a second functional liquid-proof layer, said second functional liquid-proof layer having an exterior side, an interior side, and a designated stitchless seam edge;

c. a discontinuous bond connecting the designated stitchless seam edge of the first panel to the designated stitchless seam edge of the second panel in a stacked relation to each other so that the exterior sides of the panels are bonded to each other with the bonded areas most distant from the stitchless seam edges of the panels forming a discontinuously bonded joint on the plane formed by the exterior sides of the joined panels, and d. a reinforcement traversing the discontinuous bond and further connecting the first panel and the second panel.

14. The stitchless seam of claim 13 further comprising a continuous bond connecting the designated stitchless seam edge of the first panel to the designated stitchless seam edge of the second panel in a stacked relation to each other so that the exterior sides of the panels are bonded to each other.

15. The stitchless seam of claim 14 wherein the continuous bond is oriented parallel the discontinuous bond.

16. The stitchless seam of claim 13 wherein the discontinuous bond is a heat fuse.

17. The stitchless seam of claim 16 wherein the heat fuse is formed in a cross-hatch pattern.

18. The stitchless seam of claim 16 wherein the heat fuse is formed in a dotted pattern.

19. The stitchless seam of claim 16 wherein the heat fuse is formed in a sinusoidal pattern.

20. The stitchless seam of claim 1 wherein the discontinuous fused stitchless seam is created using an ultrasonic fusing wheel comprising a circumferential discontinuous embossing rib mounted on the wheel.

21. The stitchless seam of claim 20 wherein the ultrasonic fusing wheel further comprises a circumferential cutting rib.

22. The stitchless seam of claim 21 wherein the circumferential cutting rib is mounted at least 0.1 mm from the discontinuous embossing rib.

23. The stitchless seam of claim 21 wherein the circumferential cutting rib projects further outward from the wheel than does the discontinuous embossing rib.

24. The stitchless seam of claim 21 wherein the circumferential cutting rib and the discontinuous embossing rib are parallel to each other.

25. The stitchless seam of claim 21 wherein the discontinuous fused stitchless seam connecting the first panel to the second panel is applied at the same time as the panels are cut on the designated stitchless seam edge.

26. The stitchless seam of claim 1 wherein the stitchless seam has strength of at least 150 N.

27. The stitchless seam of claim 1 wherein the stitchless seam has strength of at least 200 N.

* * * * *